United States Patent [19]

Gabbita

[11] Patent Number: 5,262,062
[45] Date of Patent: Nov. 16, 1993

[54] DECONTAMINATION PROCESS FOR REDUCING HEAVY METAL POLLUTION

[75] Inventor: Kasi V. Gabbita, Stanton, Calif.

[73] Assignee: Analytical Liquid Waste Systems, Huntington Beach, Calif.

[21] Appl. No.: 232,429

[22] Filed: Aug. 15, 1988

[51] Int. Cl.$^5$ ............................................. C02F 1/62
[52] U.S. Cl. .................................. 210/710; 210/724; 210/730; 210/912
[58] Field of Search ................ 210/716, 710, 724–730, 210/912–914

[56] References Cited

U.S. PATENT DOCUMENTS

| | | | |
|---|---|---|---|
| 4,025,430 | 5/1977 | Pagel | 210/912 X |
| 4,724,084 | 2/1988 | Pahmeier et al. | 210/912 X |
| 4,746,442 | 5/1988 | Calemma et al. | 210/725 |

*Primary Examiner*—Tom Wyse
*Attorney, Agent, or Firm*—Roger A. Marrs

[57] ABSTRACT

A decontamination treatment of process water is disclosed herein originating from electroplating/metal finishing and etching operations wherein the process water is loaded with heavy metal ions. The inventive process combines predetermined quantities of alkali/acid solutions together with a quantity of Sodium Humate so as to produce a disposable sludge which is environmentally safe and poses the least risk for leeching of harmful metals from the resultant sludge.

1 Claim, 1 Drawing Sheet

DECONTAMINATION PROCESS FOR REDUCING HEAVY METAL POLLUTION

BACKGROUND OF THE INVENTION

1. Field of the Invention

The present invention relates to a process or treatment for decontaminating process water, and more particularly relates to a novel process for removing metal pollution from electroplating and etching process water, such as the removal of metal ions commonly used in metal plating, etching and anodizing operations.

2. Brief Description of the Prior Art

As the requirement for environmental control has expanded with the increase in technological advancement and with the widening demand for improved processes and apparatus capable of handling waste products therefrom, the need for improved and safer decontamination treatments of liquids as a waste product has become of increasing importance. A concomitant of this trend is the need for effectively lowering the amounts of metal ions to acceptable standards of regulatory agencies which, while providing the requisite degree of safety, provides a convenient and manageable form of solid product rendered to a state of least environmental risk for storage or disposal. Under the thrust of this expanding requirement, it has become an economic necessity to provide an innovative process and apparatus which both minimizes the possibility of error in the decontamination procedures and reduces overall system complexity.

Particularly, in the field of electroplating and etching procedures, the accumulation of metal ions in the process water has accelerated into a critical problem for contamination and disposal. Treatment technology for removal of metal ions associated with metal plating, electroplating and etching operations is essentially linked to the use of hydroxide or sulfide precipitations. However, under actual operating field conditions, complete removal of metal ions is rarely achieved. Thus, a substantial amount of metal ions remain in the process water, some of which are carcinogenic and/or are toxic to human life, which the regulatory authorities find objectionable. There have been several new and emerging technologies to lower the levels of metal ions in the process water; however, such prior attempts have not satisfied or reached acceptable decontamination levels and questions of storage and disposal are still in existence.

Therefore, there is a growing concern, as well as a real need to improve the technology that effectively removes metal ions from the process water. An equally important concern is the fate or ultimate disposal of the resultant sludge or final sludge product.

SUMMARY OF THE INVENTION

Accordingly, the above problems and difficulties are obviated by the present invention which provides a novel process for decontamination of heavy metal pollution from metal plating and etching process water, as an example. The process permits such a treatment to be accomplished during the routine processing of wastewaters generated in metal plating, anodizing and etching operations.

In one form of the invention, the process comprises the main steps of adjusting the pH with alkali (Sodium Hydroxide) to approximately 7 or 8 so that the quantities of alkali required to neutralize and precipitate the metal ions are minimized. Next, the novel process involves addition of chemical moiety (Sodium Humate, whose amount depends on the level of metal ions and variety of metal ions in the process water). A typical amount of Sodium Humate is between 0.5 g to 1.0 g for every liter of wastewater. This step involves thorough mechanical mixing or agitation providing a residence time of up to 30 or 60 minutes depending upon the local conditions. A final step in the process consists of allowing the liquid containing metal ions, alkali and Sodium Humate to settle in a settling tank for approximately 60 to 90 minutes, followed by demoisturizing the resultant sludge into disposable cakes or product.

Therefore, a primary object of the present invention is to provide a novel decontamination process for heavy metal polluted process water which provides a process additive that effectively lowers the amount of metal ions to acceptable standards prescribed by regulatory agencies.

Another object of the present invention is to provide a novel process that renders the resultant slude from process water to a state of least environmental risk in a manner that ultimately the sludge product may be safely disposed of in a municipal landfill.

Still, another object of the present invention is to provide a novel process for effecting the removal of metal ions from the process water so that the ultimate disposal of the resultant sludge or final sludge product may be stored in a manner meeting regulatory agency requirements.

Another object of the present invention is to provide a novel process for removal of metal ions from polluted process water wherein the process allows such a treatment to be achieved during the routine processing of wastewaters generated in metal plating, anodizing and etching operations.

Yet another object of the present invention is to provide an inventive process wherein the additive chemical moiety is totally compatible with the existing treatment facilities making the invention economical and effective.

Yet another object of the present invention is to provide an innovative process additive chemical moiety for decontamination of heavy metal pollution from electroplating, metal plating or etching process water that effectively lowers the level of metal ions in the process water from the metal plating, anodizing or etching operations to amounts that are acceptable to regulatory agencies.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
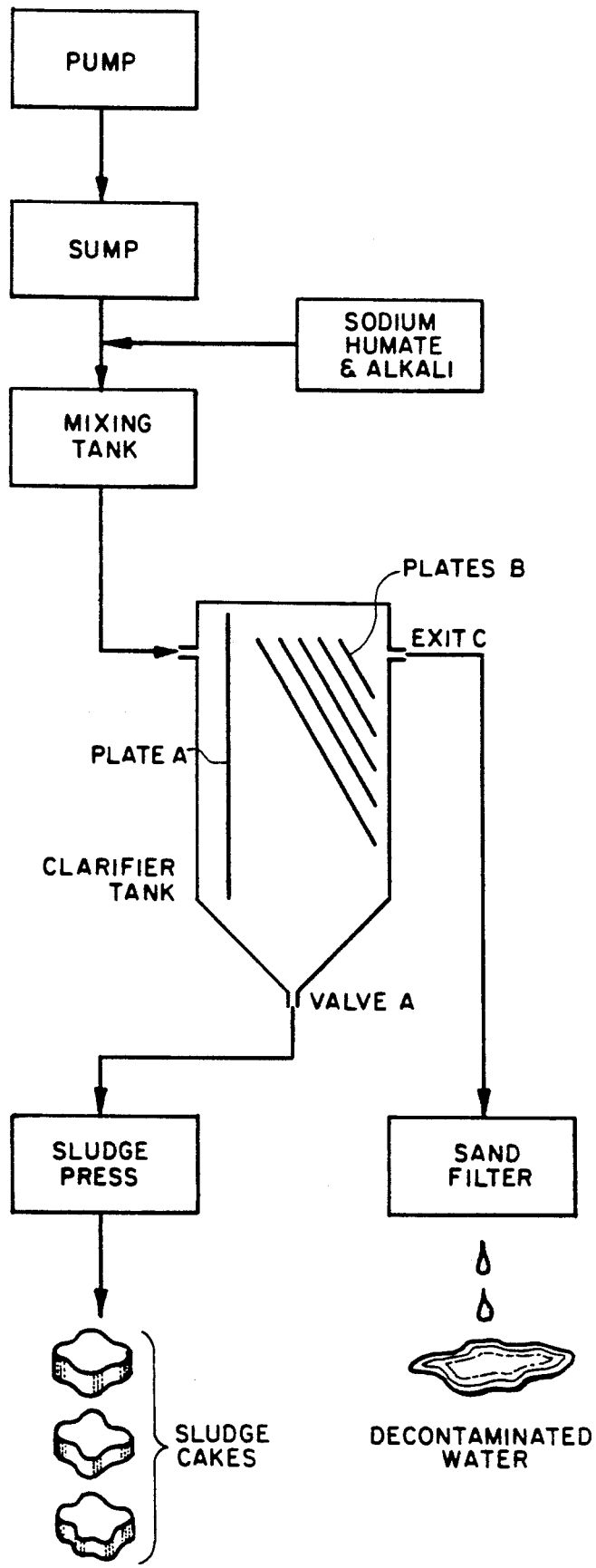
FIG. 1 is a diagrammatic drawing illustrating the sequence of steps taken in the performance of the inventive process for removing metal ions from process water.

Referring to the drawing, process or wastewater is produced from an etching or metal plating or anodizing source through normal operations wherein the process water is loaded with heavy metals such as copper, iron or the like. The process water is pumped into a reservoir or sump for temporary storage in an environmentally contained solution of approximately 100 to 200 gallons in volume until processing is commenced. Next, the process or wastewater is routed either by pump pressure or gravity feed from the sump or storage tank to a mixing tank in quantities of approximately 80 gallons. This latter tank will serve as a mixing tank where quantities of Sodium Humate and alkali are introduced for reaction with metal ions from the waste water. The Sodium Humate and alkali are provided in solution from a reservoir directly into the mixing tank wherein the solution represents a proportion of Sodium Humate and alkali effective to gain chemical reaction so as to control and balance the pH of the mix. The mixing tank employs a stirrer or other means of agitation to ensure complete mixing of the Sodium Humate and alkali with the resident metal ions contained within the process or wastewater. Mixing in the tank will typically take between 30 to 60 minutes.

Next, a clarifier tank is employed and serves as a reservoir for the Sodium Humate and alkali solution with the metal ions. The substances will be dissolved in water and released into the mixing tank as required by the contents of the mixing tank.

The wastewater, Sodium Humate and alkali mixture is then routed from the mixing tank and serves as an influent introduced to an 80 gallon clarifier tank, either by pump or gravity feed. As the water enters the tank, it is directed to the bottom of the tank by a plate A. As the clarifier tank fills and starts to empty through the exit opening at valve A, particulate matter (Humate-metal complexes as precipitates) are somewhat impeded from passing through the exit C by the diagonally disposed plates indicated by letter B. As the particulate matter rises, it contacts the diagonal plates and heavy materials fall to the bottom. This contact redirects some of the particulate matter away from the exit opening. This redirection allows more of the particulate matter to settle to the bottom of the clarifier tank. At the same time, clarified water (water that has had Humate-metal complexes deposited in the bottom of the clarifier tank) passes out of the clarifier tank into a sand filter. The Humate-precipitate known as sludge can be drawn out of the bottom of the clarifier tank through the valve A. Successful precipitation of sludge in this tank depends upon a minimal amount of liquid agitation.

The clarified liquid from exit C enters the sand filter and this filter serves as a trap for any of the precipitate that may have escaped precipitation in the clarifier tank. The filter will require periodic recharging to ensure maximum filtering process. Once the water leaves the sand filter, it may be passed into a public sewer or reused in the plant as rinse water.

The sludge from the bottom of the clarifier tank is drawn off via valve A and pumped by a sludge pump to a sludge press. Here the slurry-like sludge is compressed into sludge cakes by the removal of a substantial amount of the water. For example, a closure force of approximately 45,000 lbs. is sufficient to remove most of the moisture so that a relatively heavy, solid and sealed waste cake is produced. These cakes contain most of the metal ions originally found in the wastewater. The composition of the cakes is primarily that of Humate-metal complexes and the cakes can then be disposed of in a variety of appropriate manners.

Therefore, it can be seen that the inventive process of the present invention provides a method and means for removing pollutant metal ions from process water through the use of a combined Sodium Humate and alkali solution and mixture which effectively seals and coats and otherwise breaks down the metal ions so that they are contained in a readily disposable sealed cake. The cake is non-ferrous and is environmentally risk-free for safe disposal in landfills. A typical example is for wastewater contaminated with 237 mg/l of copper to the copper reduced to 0.78 mg/l and for wastewater contaminated with 1,620 mg/l of iron to have the iron reduced to 5.14 mg/l with the resultant sludge environmentally risk-free.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A decontamination process for reducing heavy metal pollution in wastewater, said wastewater consisting of rinse water from the etching of printed circuit boards containing copper and iron salts, comprising the steps of:
    collecting and temporarily storing the wastewater in an environmentally contained sump;
    pumping said collected and temporarily stored wastewater into a mixing tank;
    introducing a predetermined quantity of sodium humate and alkali in a water solution into the mixing tank, and combining said water solution and said wastewater with agitation to insure complete mixing of the sodium humate and alkali solution with the wastewater, said predetermined quantity resulting in a mixture having a pH of 7–8;
    routing said mixture into a clarifier tank wherein humate-metal complexes precipitate, forming an effluent liquid and a sludge;
    conducting said effluent clarified liquid to a filter, and filtering said liquid to remove any of the precipitate not precipitated in the clarifier so that the filtered effluent clarified liquid is dischargeable as a contamination-free liquid for reuse or public sewer disposal; and
    conducting said sludge to a press, and demoisturizing and compressing said sludge in said press into a sealed cake of primarily humate-metal complexes for safe disposal.

* * * * *